(12) United States Patent
Betcher et al.

(10) Patent No.: US 11,143,220 B2
(45) Date of Patent: Oct. 12, 2021

(54) TETHER CLIP

(71) Applicant: 3M INNOVATIVE PROPERTIES COMPANY, St. Paul, MN (US)

(72) Inventors: Travis P. Betcher, Goodhue, MN (US); Matthew P. Thoms, Red Wing, MN (US); Matthew J. Blackford, Hastings, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/473,292

(22) PCT Filed: Jan. 5, 2018

(86) PCT No.: PCT/US2018/012587
§ 371 (c)(1),
(2) Date: Jun. 25, 2019

(87) PCT Pub. No.: WO2018/132316
PCT Pub. Date: Jul. 19, 2018

(65) Prior Publication Data
US 2020/0124066 A1  Apr. 23, 2020

Related U.S. Application Data

(60) Provisional application No. 62/445,836, filed on Jan. 13, 2017.

(51) Int. Cl.
*F16B 2/10* (2006.01)
*A44B 6/00* (2006.01)
*A45F 5/00* (2006.01)

(52) U.S. Cl.
CPC ............... *F16B 2/10* (2013.01); *A44B 6/00* (2013.01); *A45F 5/00* (2013.01); *A45F 2005/006* (2013.01)

(58) Field of Classification Search
CPC ........ F16B 2/10; A45F 5/00; A45F 2005/006; A44B 6/00; A41F 3/02; D06F 55/02;
(Continued)

(56) References Cited

U.S. PATENT DOCUMENTS 474,719 A * 5/1892 Brande .................... F16B 2/241
24/457
1,343,641 A * 6/1920 Patterson .................. B66C 1/48
294/85

(Continued)

FOREIGN PATENT DOCUMENTS

CA          2542561          11/2006
CA          2608049           4/2008
(Continued)

OTHER PUBLICATIONS

"Glove Guard Simple Tools with Unique Designs", Glove Guard LP, 2000, [retrieved from the internet on Apr. 3, 2017], URL <http://www.gloveguard.com/gloveguard.php>, 2 pages.
(Continued)

*Primary Examiner* — Robert Sandy
*Assistant Examiner* — Rowland Do
(74) *Attorney, Agent, or Firm* — Johannes P. M. Kusters (57) ABSTRACT

A tether clip for interconnecting an anchor structure and an accessory comprises an upper clamping member, a lower clamping member, and a biasing member. The lower clamping member is pivotally connected to the upper clamping member, and the biasing member biases the upper clamping member and the lower clamping member in a closed position. A lower lanyard receiving end and an upper lanyard receiving end are adapted to receive a lanyard connected to the accessory. When the lanyard is under a tensile load, a lateral force is exerted on the lower lanyard receiving end and the upper lanyard receiving end, which translates to a
(Continued)

torsional load on the upper clamping end and the lower clamping end to place a stronger clamping force on the anchor structure in the closed position.

20 Claims, 9 Drawing Sheets

(58) Field of Classification Search
CPC ......... Y10T 24/44419; Y10T 24/44479; Y10T 24/44385; Y10T 24/44462; Y10T 24/4447; Y10T 24/44487
See application file for complete search history.

(56) References Cited

U.S. PATENT DOCUMENTS

| | | | | |
|---|---|---|---|---|
| 1,797,452 | A | * | 3/1931 | Teel .................. C14B 1/26 24/503 |
| 2,637,088 | A | * | 5/1953 | Foster .............. A01K 27/005 24/598.5 |
| 3,030,681 | A | * | 4/1962 | Phillips .............. G09F 3/16 248/229.15 |
| 3,597,813 | A | * | 8/1971 | Takahashi ........... B42F 9/001 24/67.5 |
| 3,914,828 | A | | 10/1975 | Noda |
| 4,005,510 | A | * | 2/1977 | Noda ................. A41F 3/02 24/504 |
| 4,141,119 | A | * | 2/1979 | Nodo ................. A41F 3/02 24/504 |
| 4,763,390 | A | | 8/1988 | Rooz |
| 4,839,947 | A | | 6/1989 | Cohen et al. |
| 5,247,725 | A | | 9/1993 | Vaughn, Jr. |
| 5,400,483 | A | * | 3/1995 | Noda ................. A41F 3/02 24/499 |
| 5,414,911 | A | | 5/1995 | Adams |
| 6,260,244 | B1 | * | 7/2001 | Noda ................. A41F 3/02 24/499 |
| 6,327,757 | B1 | * | 12/2001 | Noda ................. A41F 3/02 24/499 |
| 6,698,071 | B1 | | 3/2004 | Greer, Jr. et al. |
| 7,055,281 | B1 | | 6/2006 | Faneuf |
| D619,495 | S | | 7/2010 | Herman |
| 8,117,678 | B2 | | 2/2012 | Moreau et al. |
| 8,176,965 | B1 | | 5/2012 | Motosko et al. |
| 2003/0005797 | A1 | * | 1/2003 | Hopper .............. B25B 7/04 81/318 |
| 2003/0182773 | A1 | * | 10/2003 | Ellwood .............. F16B 2/20 24/334 |
| 2004/0081512 | A1 | | 4/2004 | Andersen et al. |
| 2004/0168286 | A1 | | 9/2004 | Herman |
| 2005/0177928 | A1 | | 8/2005 | Moreau et al. |
| 2010/0018013 | A1 | | 1/2010 | Vermillion et al. |
| 2015/0164206 | A1 | | 6/2015 | Reed |
| 2016/0003274 | A1 | * | 1/2016 | Garlick ............. F16B 7/0413 403/325 |
| 2016/0143384 | A1 | | 5/2016 | Moreau et al. |
| 2018/0192626 | A1 | * | 7/2018 | Jaramus ............. A01K 91/03 |

FOREIGN PATENT DOCUMENTS

| | | |
|---|---|---|
| CA | 2819601 | 6/2012 |
| CN | 203272356 U | 11/2013 |
| JP | 2000-087922 | 3/2000 |

OTHER PUBLICATIONS

"Installation and Use Instructions for Python Safety Hard Hat Tether", A User Safety Manual from DB Industries Inc, 2015, 2 pages.
Ludwig, "Drop Testing of Coil Hard Hat Lanyards", Test Report from Element Materials Technology dated Oct. 1, 2014, 3 pages.
"Objects at Heights: State of the Risk", An Ergodyne White Paper, 2015, 5 pages.
"Squids® 3158 Coil Hard Hat Lanyard with Clamp", Ergodyne, [retrieved from the internet on Apr. 3, 2017], URL <https://www.ergodyne.com/lanyards/equipment-tool-lanyards/squids-3158-coil-hard-hat-lanyard-with-clamp.html> 1 page.
International Search Report for PCT International Application No. PCT/US2018/012587, dated Apr. 25, 2018, 3 pages.
Supplementary Search Report for EP Appl. No. 18739091, dated Jul. 15, 2020, 2 pp.

* cited by examiner

TETHER CLIP

BACKGROUND OF THE INVENTION

A tether clip could be used in a variety of applications such as, but not limited to, anchoring a tether connected to a hard hat, safety glasses, tools, and other equipment to a user's clothing, safety vest, or fall protection equipment. For example, should a hard hat become dislodged from a user's head, the tether interconnecting the hard hat and the tether clip connected to the user's clothing, safety vest, or fall protection equipment will prevent the hard hat from falling.

Current tether clips have limitations. For example, tether clips made of metal tend to permanently deform when clipped to thicker anchor members, and this affects performance on thinner anchor members. Also, some anchor members, such as slippery material used for rain jackets, do not provide enough friction to prevent clips from slipping. In addition, tether clips including metal cannot be used in nuclear environments.

For the reasons stated above and for other reasons stated below, which will become apparent to those skilled in the art upon reading and understanding the present specification, there is a need in the art for an improved tether clip.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a tether clip for interconnecting an anchor structure and an accessory comprises an upper clamping member, a lower clamping member, and a biasing member. The upper clamping member has an upper contact area positioned between an upper clamping end and a lower lanyard receiving end. The lower clamping member has a lower contact area positioned between a lower clamping end and an upper lanyard receiving end. The lower clamping member is pivotally connected to the upper clamping member. The biasing member interconnects the upper clamping member and the lower clamping member and biases the upper clamping member and the lower clamping member in a closed position. The lower lanyard receiving end and the upper lanyard receiving end are adapted to receive a lanyard connected to the accessory. Pressure exerted on the upper contact area and the lower contact area overcomes the biasing member to move the upper clamping member and the lower clamping member in an open position for receiving the anchor structure between the upper clamping end and the lower clamping end. When the lanyard is under a tensile load, a lateral force is exerted on the lower lanyard receiving end and the upper lanyard receiving end, which translates to a torsional load on the upper clamping end and the lower clamping end to place a stronger clamping force on the anchor structure in the closed position.

In one embodiment, a tether clip for interconnecting an anchor structure and an accessory comprises an upper clamping member, a lower clamping member, and a biasing member. The upper clamping member has an upper contact area positioned between an upper clamping end and a lower lanyard receiving end. A first connector and a second connector interconnect the upper contact area and the upper clamping end and form a first opening therebetween. A third connector and a fourth connector interconnect the upper contact area and the lower lanyard receiving end and form a second opening therebetween. The lower clamping member has a lower contact area positioned between a lower clamping end and an upper lanyard receiving end. The lower clamping member is pivotally connected to the upper clamping member. A fifth connector and a sixth connector interconnect the lower contact area and the lower clamping end and form a channel therebetween, and portions of the fifth and sixth connectors are positioned within the first opening. A seventh connector interconnects the lower contact area and the upper lanyard receiving end, and the seventh connector extends through the second opening. The biasing member interconnects the upper clamping member and the lower clamping member and biases the upper clamping member and the lower clamping member in a closed position. The lower lanyard receiving end and the upper lanyard receiving end are adapted to receive a lanyard connected to the accessory. Pressure exerted on the upper contact area and the lower contact area overcomes the biasing member to move the upper clamping member and the lower clamping member in an open position for receiving the anchor structure between the upper clamping end and the lower clamping end. When the lanyard is under a tensile load, a lateral force is exerted on the lower lanyard receiving end and the upper lanyard receiving end, which translates to a torsional load on the upper clamping end and the loser clamping end to place a stronger force on the anchor structure in the closed position.

BRIEF DESCRIPTION OF THE DRAWINGS

The present invention can be more easily understood, and further advantages and uses thereof can be more readily apparent, when considered in view of the detailed description and the following Figures in which.

In accordance with common practice, the various described features are not drawn to scale but are drawn to emphasize specific features relevant to the present invention. Reference characters denote like elements throughout the Figures and the text.

DETAILED DESCRIPTION OF THE INVENTION

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Embodiments of the present invention provide a tether clip that clips onto and engages an anchor member and to which a tether is connected. The tether is connected to an accessory such that the tether clip and the tether interconnect the anchor member and the accessory. The tether clip could be used in a variety of applications such as, but not limited to, anchoring a tether connected to an accessory (e.g., a hard hat, safety glasses, tools, and other equipment) to an anchor member (e.g., a user's clothing, safety vest, or fall protection equipment).

Generally, one embodiment tether clip 100 shown in FIGS. 1-9 includes an upper clamping member 102 and a lower clamping member 132 that are pivotally connected. A biasing member 151 exerts a biasing force on the upper clamping member 102 and the lower clamping member 132 to position the tether clip 100 in a first closed position. Pressure exerted on contact areas 106 and 136 of the upper clamping member 102 and the lower clamping member 132 overcomes the force exerted by the biasing member 151 to move the upper clamping member 102 and the lower clamping member 132 in an open position for receiving an anchor structure between the upper clamping end 103 and the lower clamping end 133. When the lanyard 154 is under a tensile load, a lateral force is exerted on lanyard receiving ends 116 and 146, which translates to a torsional load on the upper clamping end 103 and the lower clamping end 133 to place a stronger clamping force on the anchor structure in a second closed position.

The upper clamping member 102 includes an upper clamping end 103, an upper contact area 106, and a lower lanyard receiving end 116. The upper clamping end 103 is generally rectangular and includes an engaging surface 104, which could be any suitable surface for increasing friction between the upper clamping end 103 and the anchor member, on its lower side. For example, the engaging surface could be a plurality of inwardly angled triangular shaped protrusions extending outward (downward) from the upper clamping end 103. One side of the upper clamping end 103 is connected to the upper contact area 106 with a first connector 110, and the other side of the upper clamping end 103 is connected to the upper contact area 106 with a second connector 112. Between the upper clamping end 103 and the upper contact area 106, the connectors 110 and 112 include aligning apertures 111 and 113. The connectors 110 and 112 form a first opening 114 between the upper clamping end 103 and the upper contact area 106. The upper contact area 106 includes a top portion that is generally rectangular shaped and could include a ribbed surface and sides that extend downward to connect with the connectors 110 and 112.

One side of the upper contact area 106 is connected to the lower lanyard receiving end 116 with a third connector 119, and the other side of the upper contact area 106 is connected to the lower lanyard receiving end 116 with a fourth connector 120. The connectors 119 and 120 form a second opening (not shown) between the upper contact area 106 and the lower lanyard receiving end 116. The lower lanyard receiving end 116 is generally rectangular with an aperture 117.

The lower clamping member 132 includes a lower clamping end 133, a lower contact area 136, and an upper lanyard receiving end 146. The lower clamping end 133 is generally rectangular and includes an engaging surface 134, which could be any suitable surface for increasing friction between the lower clamping end 133 and the anchor member, on its upper side. For example, the engaging surface could be a plurality of inwardly angled triangular shaped protrusions extending outward (upward) from the lower clamping end 133. One side of the lower clamping end 133 is connected to the lower contact area 136 with a fifth connector 140, and the other side of the lower clamping end 133 is connected to the lower contact area 136 with a sixth connector 142. Between the lower clamping end 133 and the lower contact area 136, the connectors 140 and 142 include aligning outwardly extending protrusions (not shown) and 143. The connectors 140 and 142 form a channel 144. A biasing member 151 extends from the lower clamping member 132 upward within the channel 144. Preferably, the biasing member 151 is integral with the lower clamping member 132, but it is recognized that it could be a separate component made of another material connected to the lower clamping member 132. The lower contact area 136 includes a first portion 137 proximate one side and a second portion 138 proximate the other side that are generally rectangular shaped and could include ribbed surfaces and sides that extend upward to connect with the connectors 140 and 142. Alternatively, the lower contact area 136 could be one piece extending from one side to the other side. The lower contact area 136 is connected to the upper lanyard receiving end 146 with a seventh connector 149. The upper lanyard receiving end 146 is generally rectangular with an aperture 147.

To connect the upper clamping member 102 to the lower clamping member 132, the lower clamping member 132 is inserted into the upper clamping member 102. The fifth and sixth connectors 140 and 142 are inserted into the first opening 114 and the seventh connector 149 is inserted into the second opening (not shown). The protrusions (not shown) and 143 extend through the apertures 111 and 113 to provide a pivotable connection. Alternatively, both clamping members could include bores through which a rivet extends to provide the pivotable connection. The clamping ends 103 and 133 align, the contact areas 106 and 136 align, and the apertures 117 and 147 of the lanyard receiving ends 116 and 146 align. The biasing member 151 extends upward from the lower clamping end 133 and places a biasing force on the upper contact area 106 thereby positioning the clamping ends 103 and 133 close together and the lanyard receiving ends 116 and 146 apart in a first closed position.

To position the tether clip 100 in an open position, pressure is exerted on the contact areas 106 and 136 to move them closer together, which overcomes the force of the biasing member 151 and moves the clamping ends 103 and 133 apart and moves the lanyard receiving ends 116 and 146 closer together. The contact areas 106 and 136 are positioned between the pivotable connection or pivot point and the lanyard receiving ends 116 and 146 to overcome the biasing force and separate the clamping ends 103 and 133. With the clamping ends 103 and 133 positioned apart, an anchor member (not shown) can be inserted between them. When pressure is removed from at least one of the contact areas 106 and 136, the biasing force from the biasing member 151 moves the tether clip 100 back into the first closed position. The anchor member is thereby positioned between the clamping ends 103 and 133, and friction assists in keeping the anchor member in place. The anchor member could be any suitable material or structure.

A lanyard (not shown) is inserted through the apertures 117 and 147 of the lanyard receiving ends 116 and 146. The lanyard is connected to an accessory, and should the accessory become dislodged or dropped, a load is applied to the tether clip 100. When such a load is applied to the tether clip 100, a choking affect is applied to the lanyard receiving ends 116 and 146, the lanyard being pulled and moving the lanyard receiving ends 116 and 146 closer together, which in turn imparts leverage onto the tether clip 100 that increases the clamping force on the anchor member by the clamping ends 103 and 133.

There is a primary clamping force with the biasing member and friction on the anchor member in the first closed position, and there is a secondary clamping force when subjected to a load and the lanyard compresses the lanyard receiving ends 116 and 146 in a second closed position. For the secondary clamping force to occur, the lanyard must be routed through both apertures 117 and 147.

Generally, another embodiment tether clip 200 shown in FIGS. 10-21 includes an upper clamping member 202 and a lower clamping member 232 that are pivotally connected. A biasing member 251 exerts a biasing force on the upper clamping member 202 and the lower clamping member 232 to position the tether clip 200 in a first closed position. Pressure exerted on contact areas 206 and 236 of the upper clamping member 202 and the lower clamping member 232 overcomes the force exerted by the biasing member 251 to move the upper clamping member 202 and the lower clamping member 232 in an open position for receiving an anchor structure between the upper clamping end 203 and the lower clamping end 233. When the lanyard 254 is under a tensile load, a lateral force is exerted on lanyard receiving ends 216 and 246, which translates to a torsional load on the upper clamping end 203 and the lower clamping end 233 to place a stronger clamping force on the anchor structure 256 in a second closed position.

The upper clamping member 202 includes an upper clamping end 203, an upper contact area 206, and a lower lanyard receiving end 216. The upper clamping end 203 is generally rectangular and includes an engaging surface 204, which could be any suitable surface for increasing friction between the upper clamping end 203 and the anchor member, on its lower side. For example, the engaging surface could be a plurality of inwardly angled triangular shaped protrusions extending outward (downward) from the upper clamping end 203. One side of the upper clamping end 203 is connected to the upper contact area 206 with a first connector 210, and the other side of the upper clamping end 203 is connected to the upper contact area 206 with a second connector 212. Between the upper clamping end 203 and the upper contact area 206, the connectors 210 and 212 include aligning apertures 211 and 213. The connectors 210 and 212 form a first opening 214 between the upper clamping end 203 and the upper contact area 206. The upper contact area 206 includes a top portion that is generally rectangular shaped and could include a ribbed surface, sides that extend downward to connect with the connectors 210 and 212, and sides that extend downward adjacent the other sides to create a receptacle 207 proximate the bottom of the upper contact area 206.

One side of the upper contact area 206 is connected to the lower lanyard receiving end 216 with a third connector 219, and the other side of the upper contact area 206 is connected to the lower lanyard receiving end 216 with a fourth connector 220. The connectors 219 and 220 form a second opening 221 between the upper contact area 206 and the lower lanyard receiving end 216. The lower lanyard receiving end 216 is generally rectangular with an aperture 217.

The lower clamping member 232 includes a lower clamping end 233, a lower contact area 236, and an upper lanyard receiving end 246. The lower clamping end 233 is generally rectangular and includes an engaging surface 234, which could be any suitable surface for increasing friction between the lower clamping end 233 and the anchor member, on its upper side. For example, the engaging surface could be a plurality of inwardly angled triangular shaped protrusions extending outward (upward) from the lower clamping end 233. The lower clamping end 233 is connected to the lower contact area 236 with a fifth connector 240. Between the lower clamping end 233 and the lower contact area 236, the connector 240 includes a bore 241 extending laterally therethrough. The lower contact area 236 is generally rectangular shaped and includes a receptacle 237 proximate its upper surface and its bottom surface could include ribbed surfaces. Alternatively, the lower contact area 236 could include more than one portion. The lower contact area 236 is connected to the upper lanyard receiving end 246 with a sixth connector 249. The upper lanyard receiving end 246 is generally rectangular with an aperture 247.

To connect the upper clamping member 202 to the lower clamping member 232, the lower clamping member 232 is inserted into the upper clamping member 202 with a biasing member 252 positioned within the receptacles 207 and 237. An example of a suitable biasing member 252 is a compression spring. The fifth connector 240 is inserted into the first opening 214 and the sixth connector 249 is inserted into the second opening 221. The bore 241 aligns with the apertures 211 and 213 and a rivet 242 is inserted therethrough to provide a pivotable connection. Alternatively, one of the clamping members could include protrusions that extend through apertures in the other of the clamping members provide the pivotable connection. The clamping ends 203 and 233 align, the contact areas 206 and 236 align, and the apertures 217 and 247 of the lanyard receiving ends 216 and 246 align. The biasing member 251 extends from within the receptacle 237 upward into the receptacle 207 and places a biasing force on the upper contact area 206 and the lower contact area 236 thereby positioning the clamping ends 203 and 233 close together and the lanyard receiving ends 216 and 246 apart in a first closed position.

Figure 1:
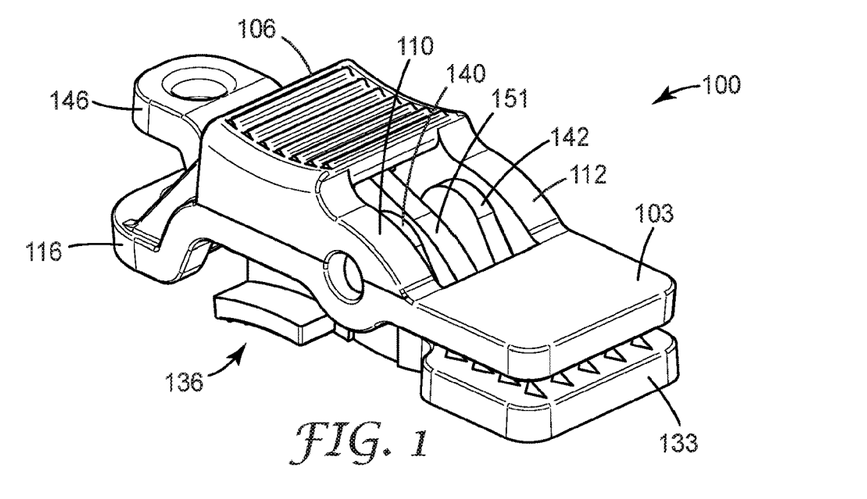
FIG. 1 is a perspective view of a tether clip constructed in accordance with the principles of the present invention.
Figure 2:
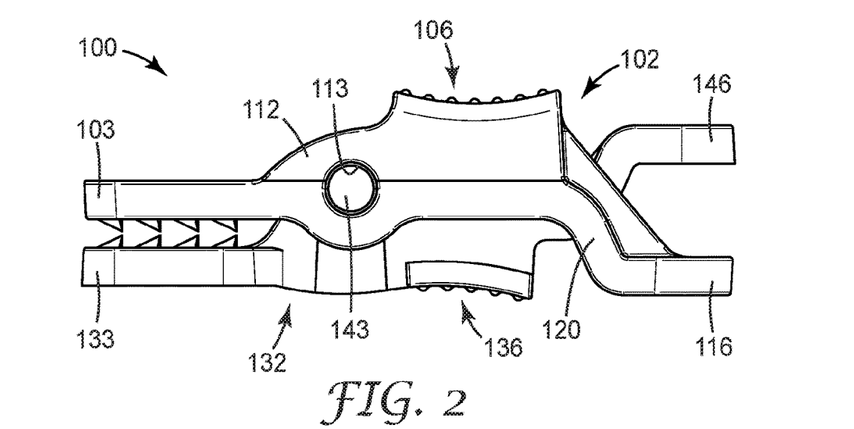
FIG. 2 is a side view of the tether clip shown in FIG. 1.
Figure 3:
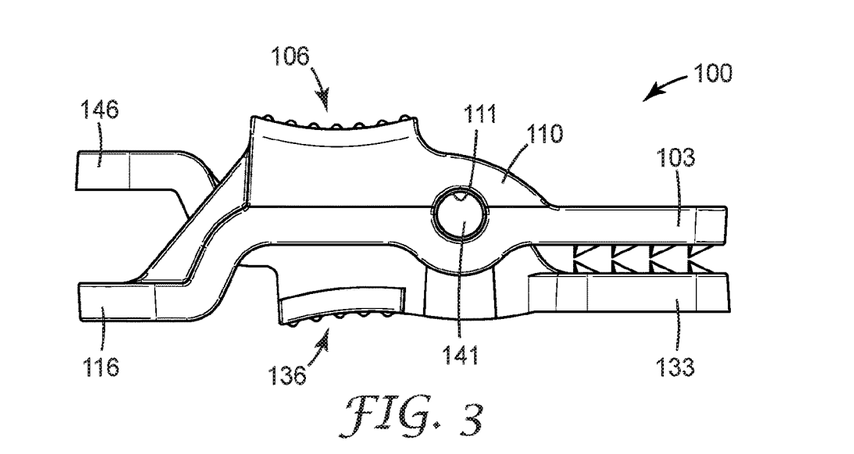
FIG. 3 is a side view of the tether clip shown in FIG. 1.
Figure 4:
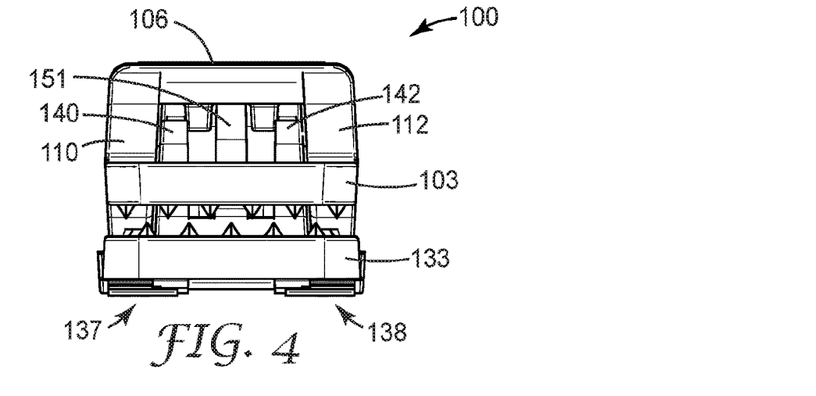
FIG. 4 is a front view of the tether clip shown in FIG. 1.
Figure 5:
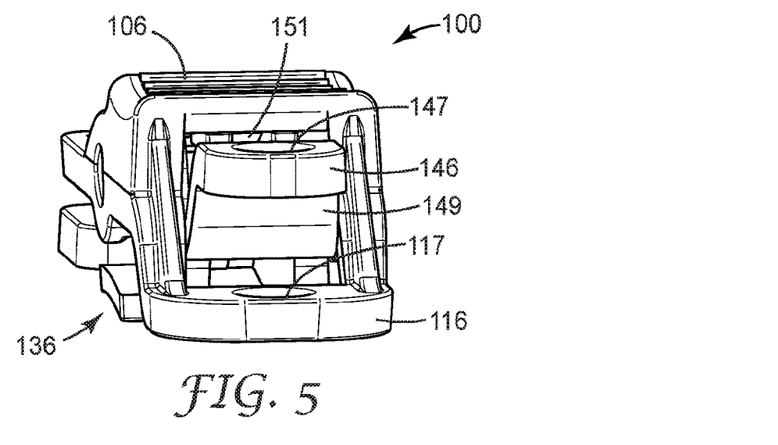
FIG. 5 is a rear view of the tether clip shown in FIG. 1.
Figure 6:
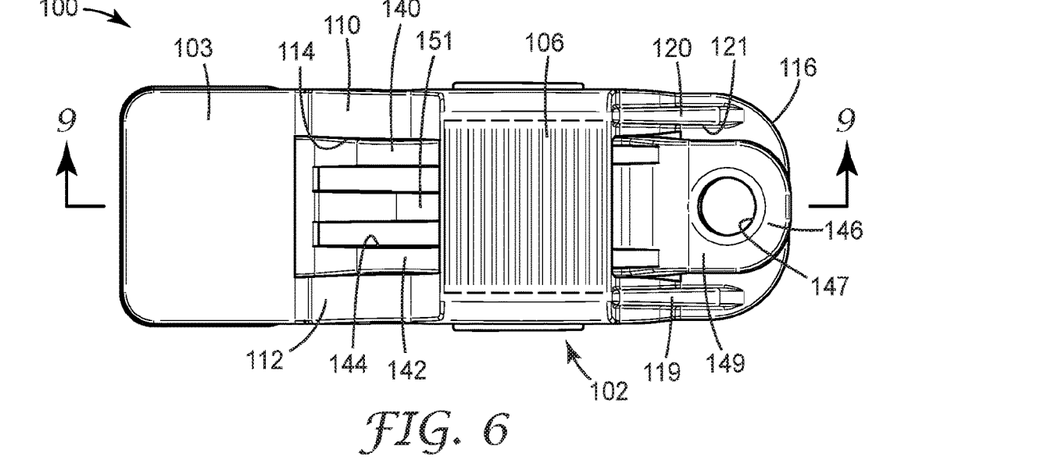
FIG. 6 is a top view of the tether clip shown in FIG. 1.
Figure 7:
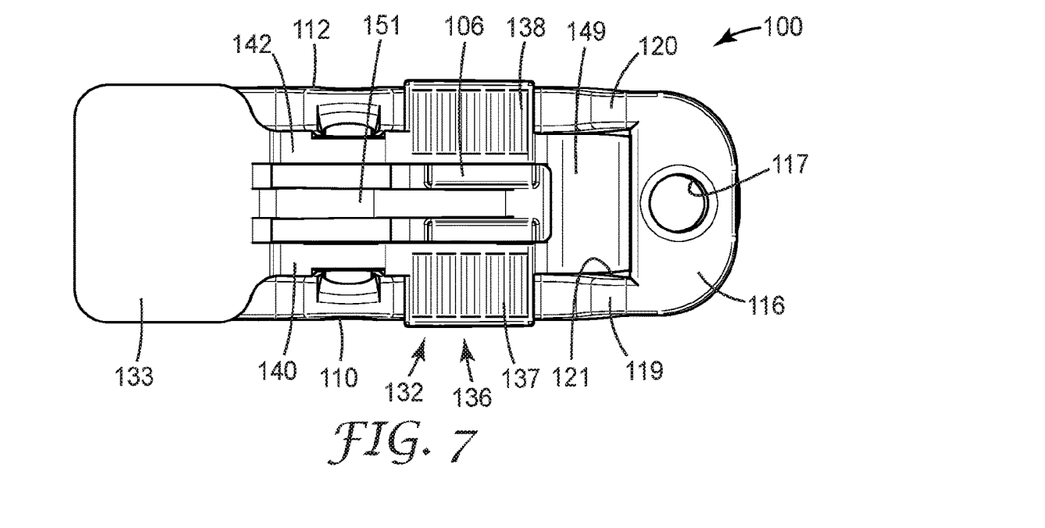
FIG. 7 is a bottom view of the tether clip shown in FIG. 1.
Figure 8:
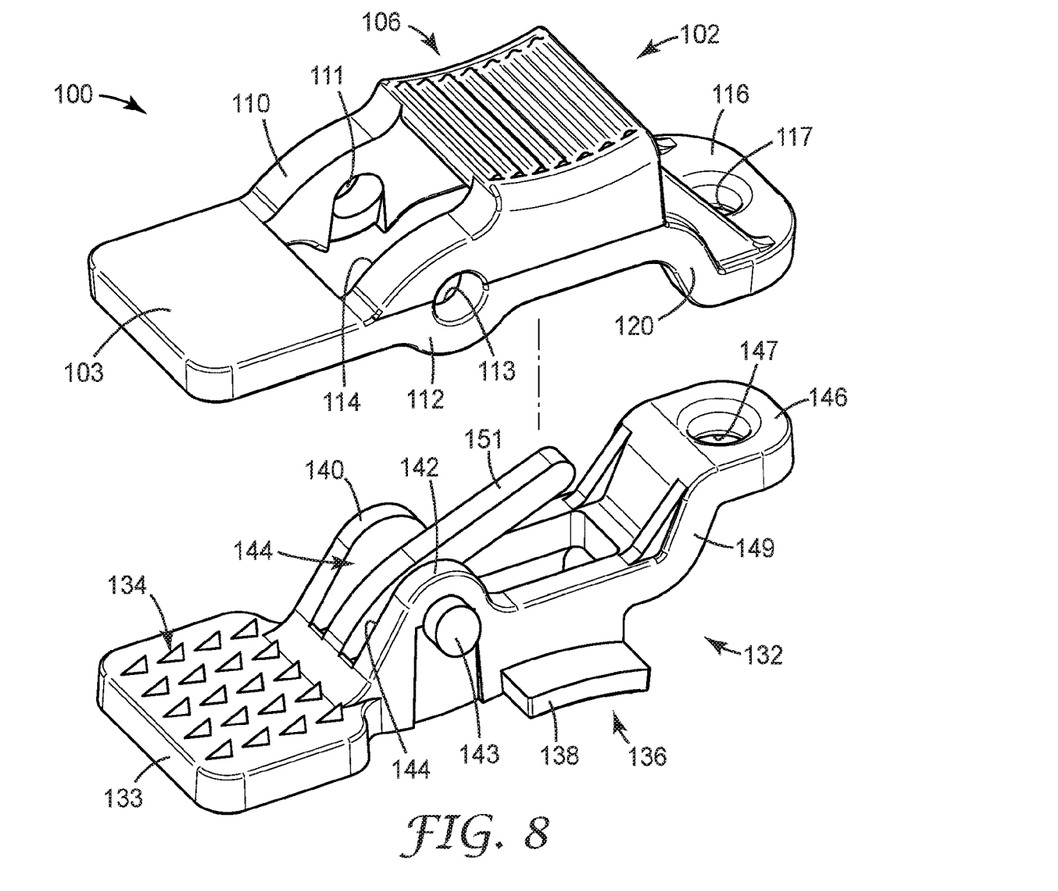
FIG. 8 is an exploded perspective view of the tether clip shown in FIG. 1.
Figure 9:
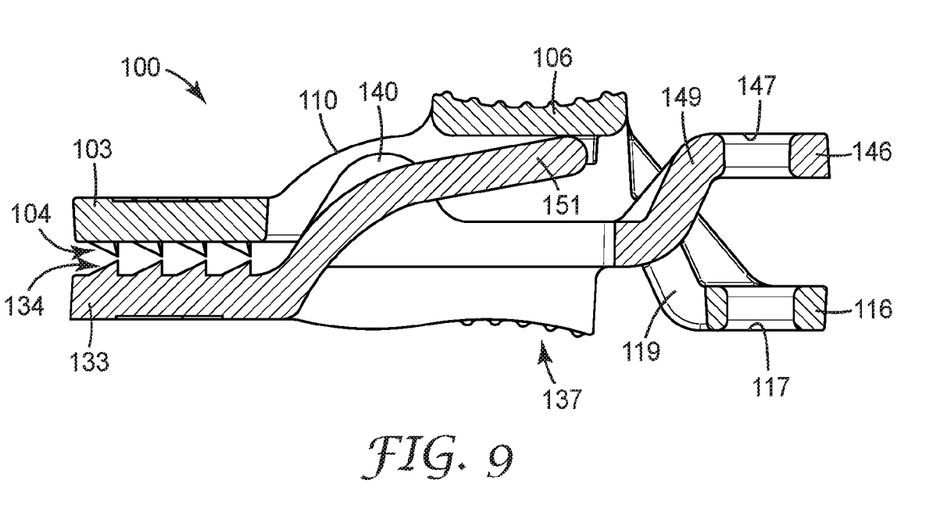
FIG. 9 is a cross section view of the tether clip shown in FIG. 1 taken along the lines 9-9 in FIG. 6.
Figure 10:
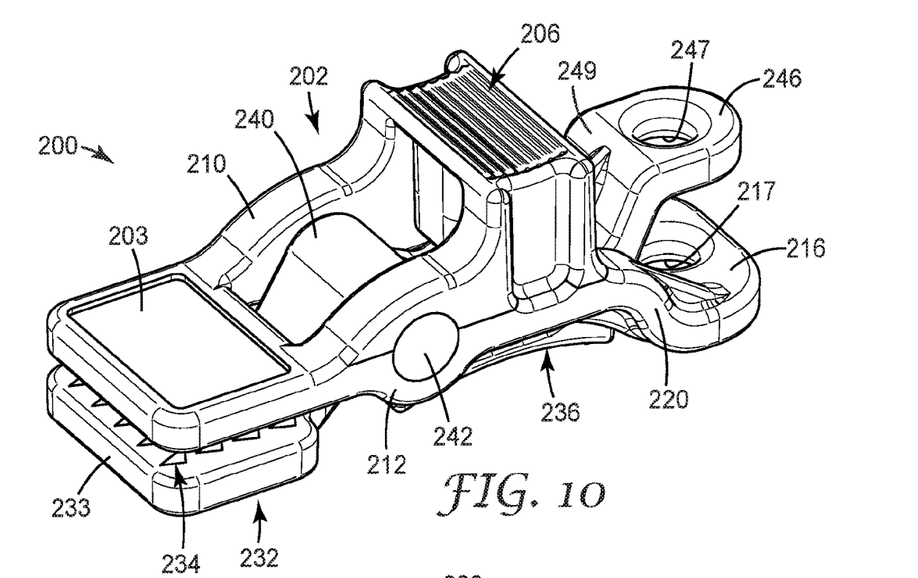
FIG. 10 is a perspective view of another embodiment tether clip constructed in accordance with the principles of the present invention.
Figure 11:
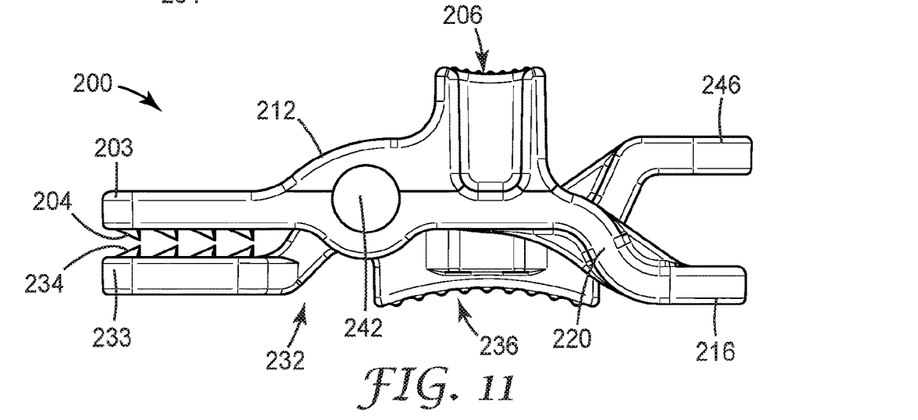
FIG. 11 is a side view of the tether clip shown in FIG. 10.
Figure 12:
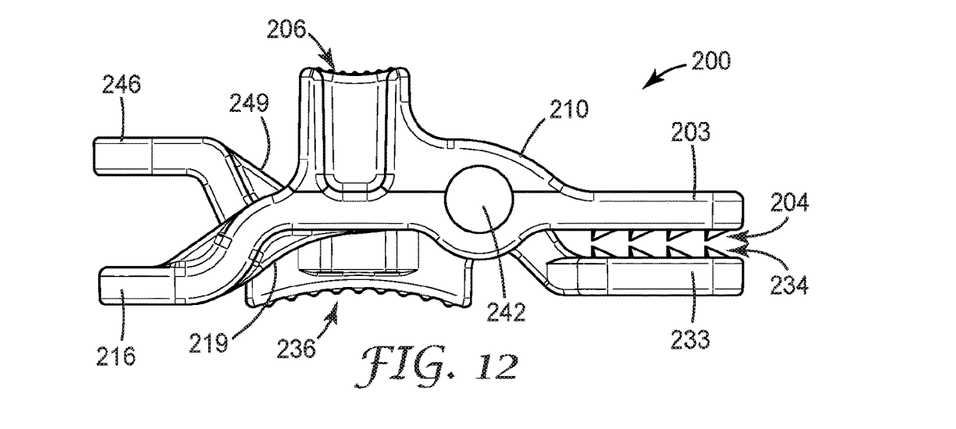
FIG. 12 is a side view of the tether clip shown in FIG. 10.
Figure 13:
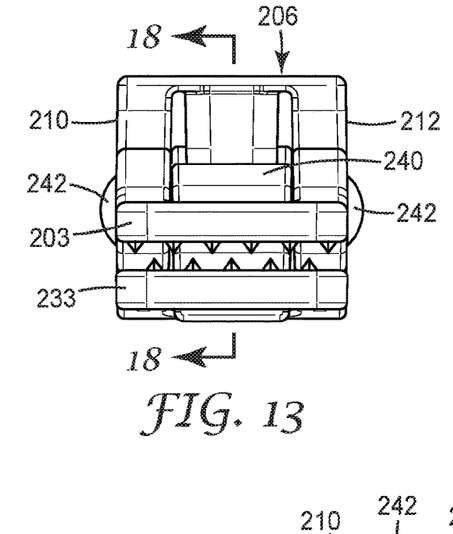
FIG. 13 is a front view of the tether clip shown in FIG. 10.
Figure 14:
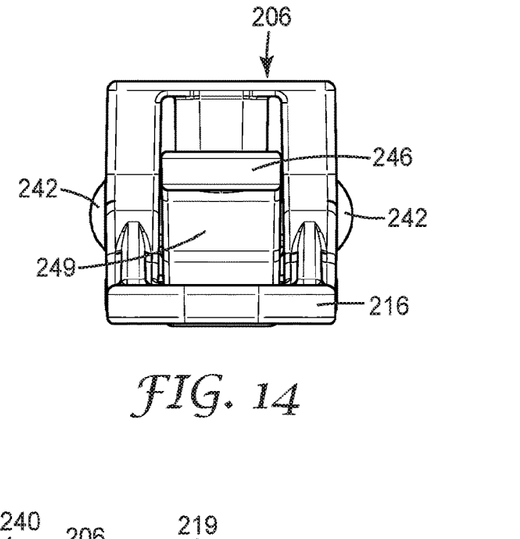
FIG. 14 is a rear view of the tether clip shown in FIG. 10.
Figure 15:
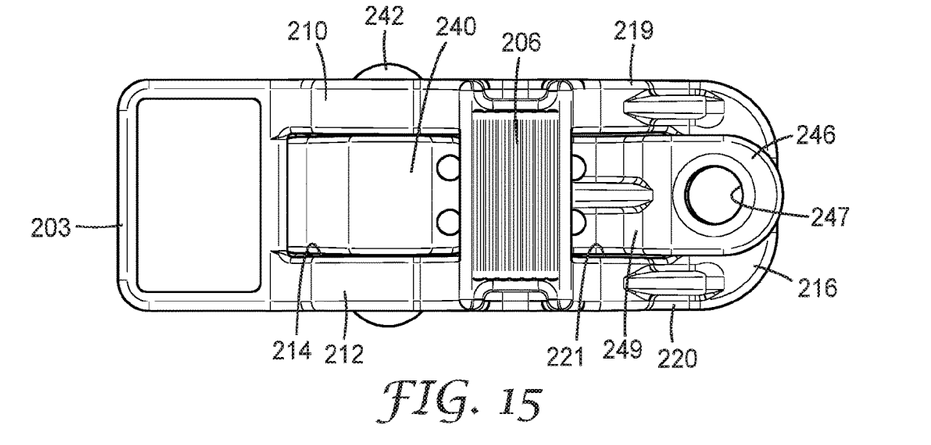
FIG. 15 is a top view of the tether clip shown in FIG. 10.
Figure 16:
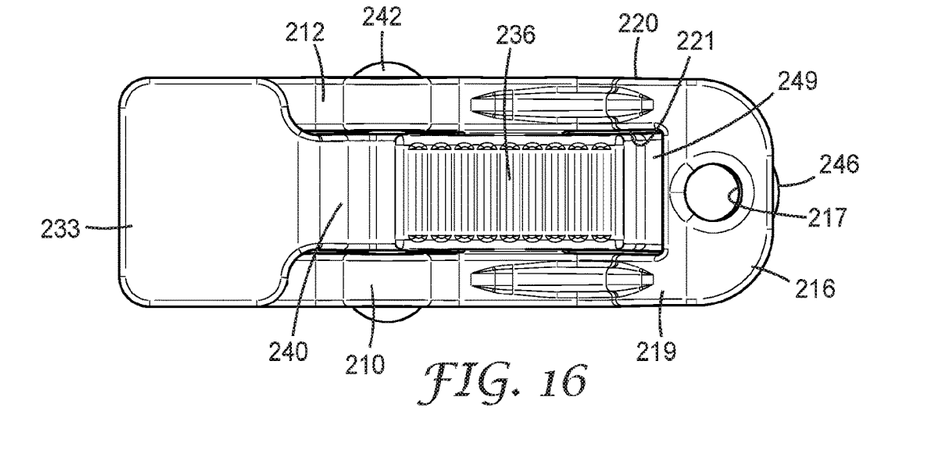
FIG. 16 is a bottom view of the tether clip shown in FIG. 10.
Figure 17:
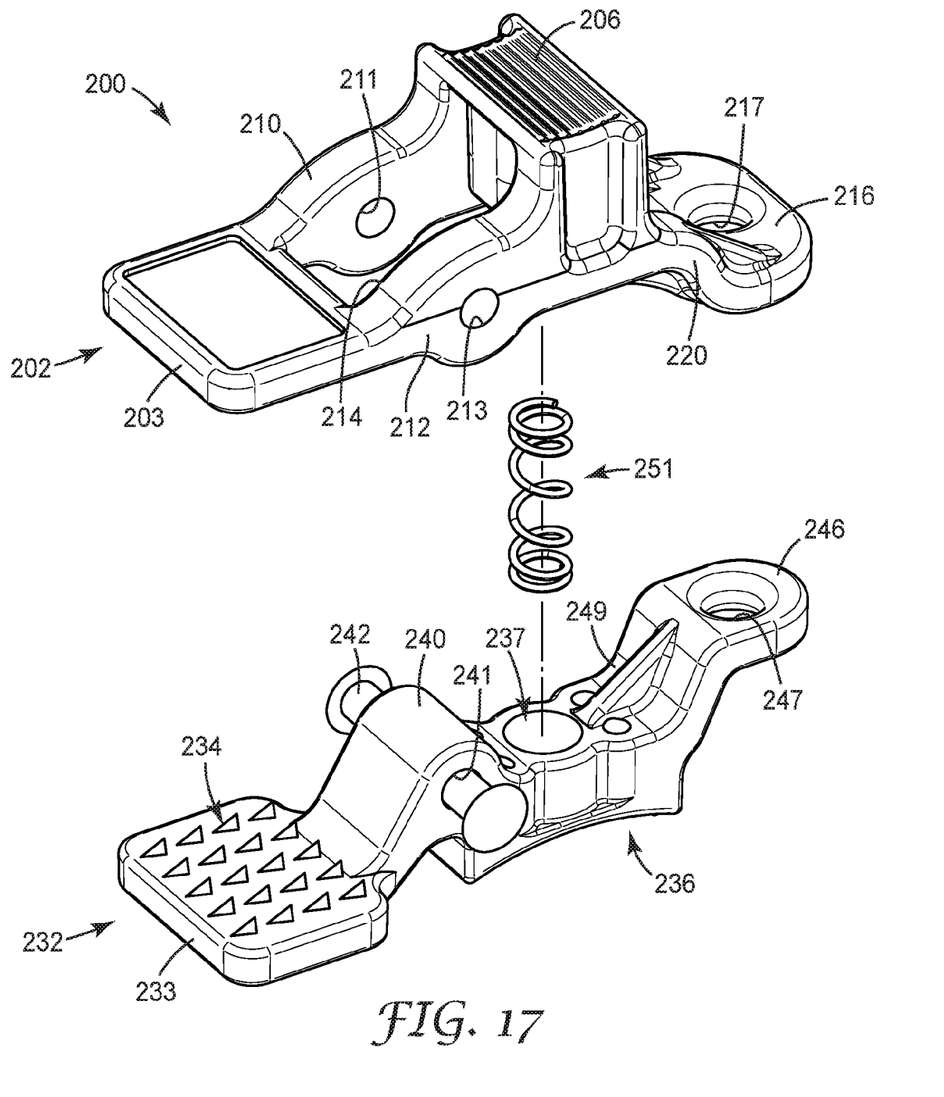
FIG. 17 is an exploded perspective view of the tether clip shown in FIG. 10.
Figure 18:
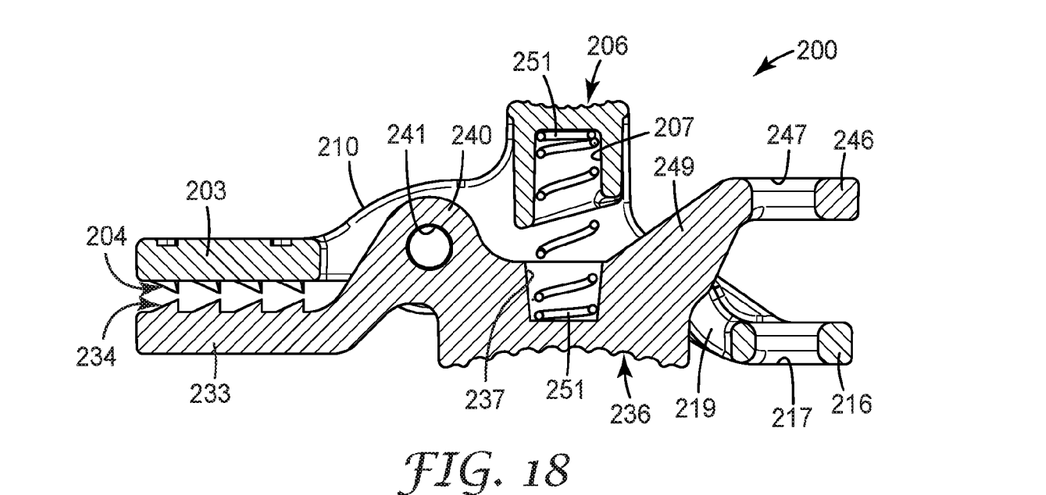
FIG. 18 is a cross section view of the tether clip shown in FIG. 10 taken along the lines 18-18 in FIG. 13.
Figure 19:
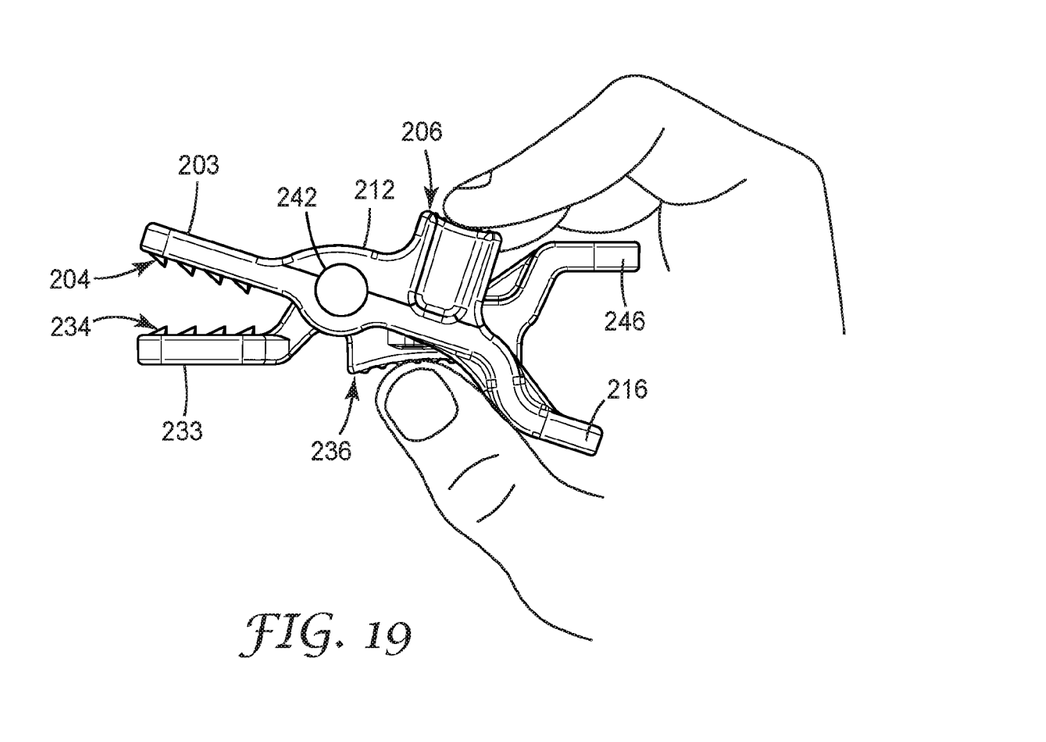
FIG. 19 is a side view of the tether clip shown in FIG. 10 shown in an open position.

To position the tether clip 200 in an open position, as shown in FIG. 19, pressure is exerted on the contact areas 206 and 236 to move them closer together, which overcomes the force of the biasing member 251 and moves the clamping ends 203 and 233 apart and moves the lanyard receiving ends 216 and 246 closer together. The contact areas 206 and 236 are positioned between the pivotable connection or pivot point and the lanyard receiving ends 216 and 246 to overcome the biasing force and separate the clamping ends 203 and 233. With the clamping ends 203 and 233 positioned apart, an anchor member 256 can be inserted between them. When pressure is removed from at least one of the contact areas 206 and 236, the biasing force from the biasing member 251 moves the tether clip 200 back into the first closed position. The anchor member 256 is thereby positioned between the clamping ends 203 and 233, and friction assists in keeping the anchor member 256 in place. The anchor member 256 could be any suitable material or structure.

A lanyard 254 is inserted through the apertures 217 and 247 of the lanyard receiving ends 216 and 246. The tether clip 200 is shown with the anchor member 256 and the lanyard 254 in the first closed position in FIG. 20. The lanyard 254 is connected to an accessory, and should the accessory become dislodged or dropped, a load is applied to the tether clip 200. When such a load is applied to the tether clip 200, a choking affect is applied to the lanyard receiving ends 216 and 246, the lanyard being pulled and moving the lanyard receiving ends 216 and 246 closer together, which in turn imparts leverage onto the tether clip 200 that increases the clamping force on the anchor member by the clamping ends 203 and 233. The tether clip 200 is shown with the anchor member 256 and the lanyard 254 in the second closed position, with the increased clamping force due to the choking affect applied by the lanyard 254, in FIG. 21.

Figure 20:
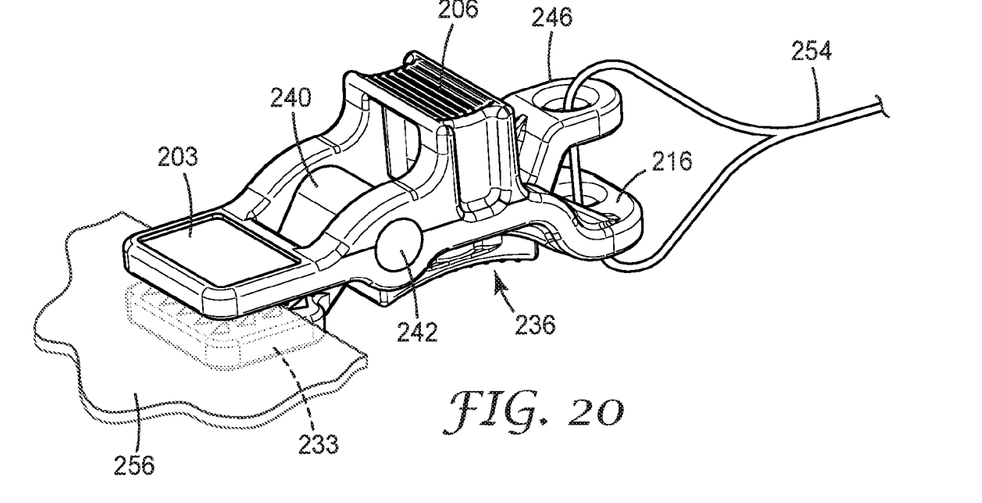
FIG. 20 is a perspective view of the tether clip shown in FIG. 10 connected to a tether and an anchor member and in a first closed position.
Figure 21:
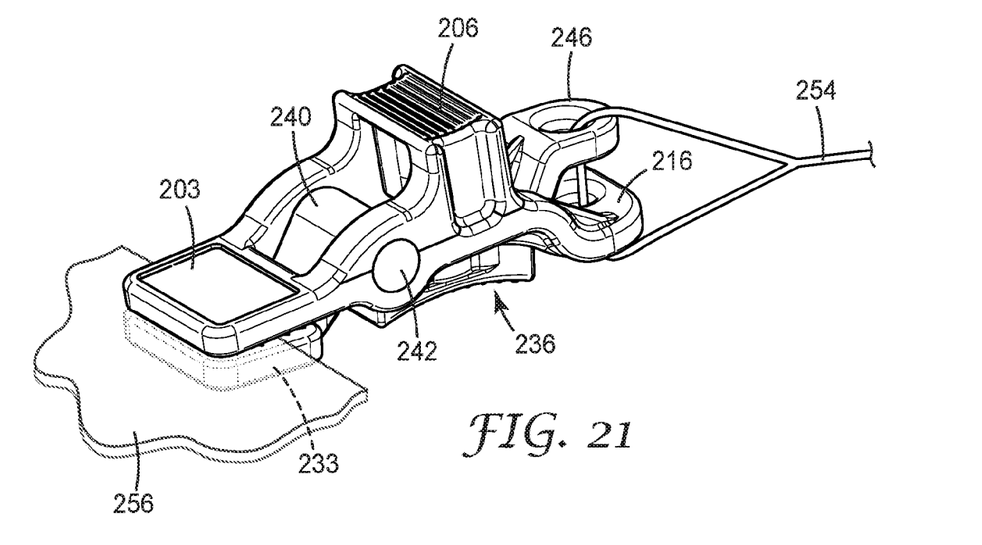
FIG. 21 is a perspective view of the tether clip shown in FIG. 10 connected to a tether and an anchor member and in a second closed position.

There is a primary clamping force with the biasing member and friction on the anchor member in the first closed position, and there is a secondary clamping force when subjected to a load and the lanyard compresses the lanyard receiving ends 216 and 246 in a second closed position. For the secondary clamping force to occur, the lanyard must be routed through both apertures 217 and 247.

In embodiments of the present invention, the tether clip uses torsion and a choking affect to increase its gripping strength on an anchor member. As the tether is pulled, the tether increases compression between the lanyard receiving ends, which creates more leverage thereby increasing torsion and clamping force of the clamping ends on the anchor member. Because of the increased gripping strength, it is recognized that the tether clip could be used for heavier items tethered to other suitable types of anchor members.

The tether clip could be made of any suitable material. For example, the tether clip could be made of at least one of nylon, thermoplastic, polycarbonate, polyethylene, metal, or wood. More than one material could be used for each tether clip.

Example 1

A test was performed to compare the performance of various tether clips currently in the market to the tether clip of the invention. Each clip was tested with a variety of weights and clipped to different anchor members. The weights were dropped from a distance twice the length of the lanyard. All of the tether clips were connected to identical lanyards to remove the variable that different lanyards could impart. The tether clip of the invention was also tested without the choking affect to verify that the leverage created improves the gripping function of the clip.

The tether clips, the anchor members, and the weights that were used in the test are identified in Table 1. In Table 1, H means the clip held, S means the clip slipped more than ⅛ inch, O means the clip slipped off or broke, X means not applicable.

TABLE 1

Performance of Varoius Tether Clips

| Anchor Member | Weight (Pounds) | Holdup Suspender Clip U.S. Pat. No. D619495 | | | Gloveguard Glove Gripper Part # 1939BK | | | Ergodyne Clip Part # 3158 from Squids | | | Ty-Flot Clip Part # EZLNYHR DCLMTL | | | 3M Model 15000061 | | | New Clip Aluminum Pin and Steel Coil Spring 1 Tab Connection | | | New Clip Aluminum Pin and Steel Coil Spring 2 Tabs Connection | | |
|---|---|---|---|---|---|---|---|---|---|---|---|---|---|---|---|---|---|---|---|---|---|
| Plain Nylon Webbing 1" wide, 0.050" thick | 4 | S | S | O | O | O | O | O | O | O | O | O | O | O | O | O | O | O | O | H | H | H |
| | 10 | X | X | X | X | X | X | X | X | X | X | X | X | X | X | X | X | X | X | H | H | H |
| Polyurethane Coated Webbing | 4 | S | S | S | O | O | O | S | S | S | S | S | S | O | O | O | O | O | O | H | H | H |
| | 10 | S | S | S | X | X | X | | | | O | | | X | X | X | X | X | X | H | O | O |
| Canvas Coat Material - Rip Stop Weave, Nomex Fire Resistant Fabric with a Sewn Border | 4 | S | S | S | O | O | S | O | | | S | S | S | S | S | S | O | O | O | H | H | H |
| | 10 | O | | | X | X | O | | | | | | | S | S | O | X | X | X | H | H | H |
| Rain Jacket Material - | 0.5 | S | S | S | S | S | O | | | | | | | O | O | O | O | O | O | H | H | H |
| | 1 | O | O | O | O | O | O | | | | | | | O | O | O | O | O | O | H | H | H |
| Coated Nylon Fabric with Outside Coating | 4 | O | O | O | O | O | O | O | O | O | O | O | O | O | O | O | O | O | O | O | O | O |
| | 10 | X | X | X | X | X | X | | | | X | X | X | X | X | X | X | X | X | X | X | X |

The test results shown in Table 1 clearly demonstrate the performance improvement of the present invention tether clip compared to tether clips currently in the market.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. A tether clip for interconnecting an anchor structure and an accessory, comprising:
   an upper clamping member having an upper contact area positioned between an upper clamping end and a lower lanyard receiving end;
   a lower clamping member having a lower contact area positioned between a lower clamping end and an upper lanyard receiving end, the lower clamping member being pivotally connected to the upper clamping member;
   a biasing member interconnecting the upper clamping member and the lower clamping member and biasing the upper clamping member and the lower clamping member in a closed position;
   wherein the lower lanyard receiving end and the upper lanyard receiving end are adapted to receive a lanyard connected to the accessory;
   wherein pressure exerted on the upper contact area and the lower contact area to move them closer together overcomes the biasing member to move the upper clamping member and the lower clamping member in an open position for receiving the anchor structure between the upper clamping end and the lower clamping end; and
   wherein when the lanyard is under a tensile load, a lateral force is exerted on the lower lanyard receiving end and the upper lanyard receiving end, which translates to a torsional load on the upper clamping end and the lower clamping end to place a stronger clamping force on the anchor structure in the closed position.

2. The tether clip of claim 1, wherein the upper clamping member and the lower clamping member are made of at least one of the materials selected from the group consisting of nylon, thermoplastic, polycarbonate, polyethylene, metal, and wood.

3. The tether clip of claim 1, wherein the biasing member is integral with the lower clamping member and places a biasing force on the upper contact area.

4. The tether clip of claim 1, wherein the biasing member is a compression spring.

5. The tether clip of claim 1, wherein the upper and lower clamping members are pivotally connected between the upper and lower contact areas and the upper and lower clamping ends.

6. The tether clip of claim 1, wherein the upper clamping end has an upper engaging surface and the lower clamping end has a lower engaging surface.

7. The tether clip of claim 6, wherein at least one of the upper engaging surface and the lower engaging surface includes a plurality of protrusions that are angled inward.

8. The tether clip of claim 1, further comprising:
   a first connector and a second connector interconnecting the upper contact area and the upper clamping end and forming a first opening therebetween;
   a third connector and a fourth connector interconnecting the upper contact area and the lower lanyard receiving end and forming a second opening therebetween;
   a fifth connector and a sixth connector interconnecting the lower contact area and the lower clamping end and forming a channel therebetween, portions of the fifth and sixth connectors being positioned within the first opening;
   a seventh connector interconnecting the lower contact area and the upper lanyard receiving end, the seventh connector extending through the second opening; and
   the biasing member positioned within the channel.

9. The tether clip of claim 8, wherein the first and second connectors include apertures and the fifth and sixth connectors include protrusions extending through the apertures for pivotally connecting the upper and lower clamping members.

10. The tether clip of claim 9, wherein the upper and lower clamping members are pivotally connected between the upper and lower contact areas and the upper and lower clamping ends.

11. A tether clip for interconnecting an anchor structure and an accessory, comprising:
   an upper clamping member having an upper contact area positioned between an upper clamping end and a lower lanyard receiving end;
   a first connector and a second connector interconnecting the upper contact area and the upper clamping end and forming a first opening therebetween;
   a third connector and a fourth connector interconnecting the upper contact area and the lower lanyard receiving end and forming a second opening therebetween;
   a lower clamping member having a lower contact area positioned between a lower clamping end and an upper lanyard receiving end, the lower clamping member being pivotally connected to the upper clamping member;
   a fifth connector and a sixth connector interconnecting the lower contact area and the lower clamping end and forming a channel therebetween, portions of the fifth and sixth connectors being positioned within the first opening;
   a seventh connector interconnecting the lower contact area and the upper lanyard receiving end, the seventh connector extending through the second opening;
   a biasing member interconnecting the upper clamping member and the lower clamping member and biasing the upper clamping member and the lower clamping member in a closed position;
   wherein the lower lanyard receiving end and the upper lanyard receiving end are adapted to receive a lanyard connected to the accessory;
   wherein pressure exerted on the upper contact area and the lower contact area overcomes the biasing member to move the upper clamping member and the lower clamping member in an open position for receiving the anchor structure between the upper clamping end and the lower clamping end; and
   wherein when the lanyard is under a tensile load, a lateral force is exerted on the lower lanyard receiving end and the upper lanyard receiving end, which translates to a torsional load on the upper clamping end and the loser clamping end to place a stronger force on the anchor structure in the closed position.

12. The tether clip of claim 11, wherein the upper clamping member and the lower clamping member are made of at least one of the materials selected from the group consisting of nylon, thermoplastic, polycarbonate, polyethylene, metal, and wood.

13. The tether clip of claim 11, wherein the biasing member is integral with the lower clamping member and places a biasing force on the upper contact area.

14. The tether clip of claim 11, wherein the biasing member is a compression spring.

15. The tether clip of claim 11, wherein the biasing member is positioned within the channel.

16. The tether clip of claim 11, wherein the first and second connectors include apertures and the fifth and sixth connectors include protrusions extending through the apertures for pivotally connecting the upper and lower clamping members.

17. The tether clip of claim 16, wherein the upper and lower clamping members are pivotally connected between the upper and lower contact areas and the upper and lower clamping ends.

18. The tether clip of claim 11, wherein the upper and lower clamping members are pivotally connected between the upper and lower contact areas and the upper and lower clamping ends.

19. The tether clip of claim 11, wherein the upper clamping end has an upper engaging surface and the lower clamping end has a lower engaging surface.

20. The tether clip of claim 19, wherein at least one of the upper engaging surface and the lower engaging surface includes a plurality of protrusions that are angled inward.

\* \* \* \* \*